United States Patent [19]
Hargrave et al.

[11] 3,941,447
[45] Mar. 2, 1976

[54] CAMERA FLASH SOCKET

[75] Inventors: Jerry Lee Hargrave, Rochester; Harold Lee Malone, East Rochester, both of N.Y.

[73] Assignee: Eastman Kodak Company, Rochester, N.Y.

[22] Filed: Nov. 29, 1974

[21] Appl. No.: 528,529

[52] U.S. Cl. ............ 339/91 R; 240/1.3; 339/184 L; 339/186 R
[51] Int. Cl.² ........................................ H01R 13/54
[58] Field of Search ....... 339/65, 66 R, 66 M, 66 T, 339/91 R, 91 F, 91 L, 91 P, 147 R, 176 L, 184 R, 184 L, 184 M, 184 T, 186 R, 186 M, 186 T; 240/1.3

[56] References Cited
UNITED STATES PATENTS

| | | | |
|---|---|---|---|
| 3,065,447 | 11/1962 | Maurer | 339/184 M |
| 3,407,717 | 10/1968 | Ernisse | 339/91 L |
| 3,614,412 | 10/1971 | Bellows | 240/1.3 |
| 3,748,985 | 7/1973 | Brandt | 240/1.3 |

FOREIGN PATENTS OR APPLICATIONS

| | | | |
|---|---|---|---|
| 2,062,650 | 6/1971 | Germany | 339/176 L |

*Primary Examiner*—Roy Lake
*Assistant Examiner*—Mark S. Bicks
*Attorney, Agent, or Firm*—R. F. Brothers

[57] ABSTRACT

A camera flash socket, adapted to releasably retain the base of a flash unit, has a plurality of resilient fingers for engaging retaining surfaces in the base of the flash unit, a projecting portion for preventing improper insertion of the base of a flash unit in the socket and a plurality of electrical connectors. In a preferred embodiment, the flash socket includes three connectors in the form of spring-biased contacts and further includes two pairs of opposed resilient fingers, the fingers being positioned to retain the base of the flash unit in the socket when the base is presented in a proper orientation with respect to the socket.

7 Claims, 7 Drawing Figures

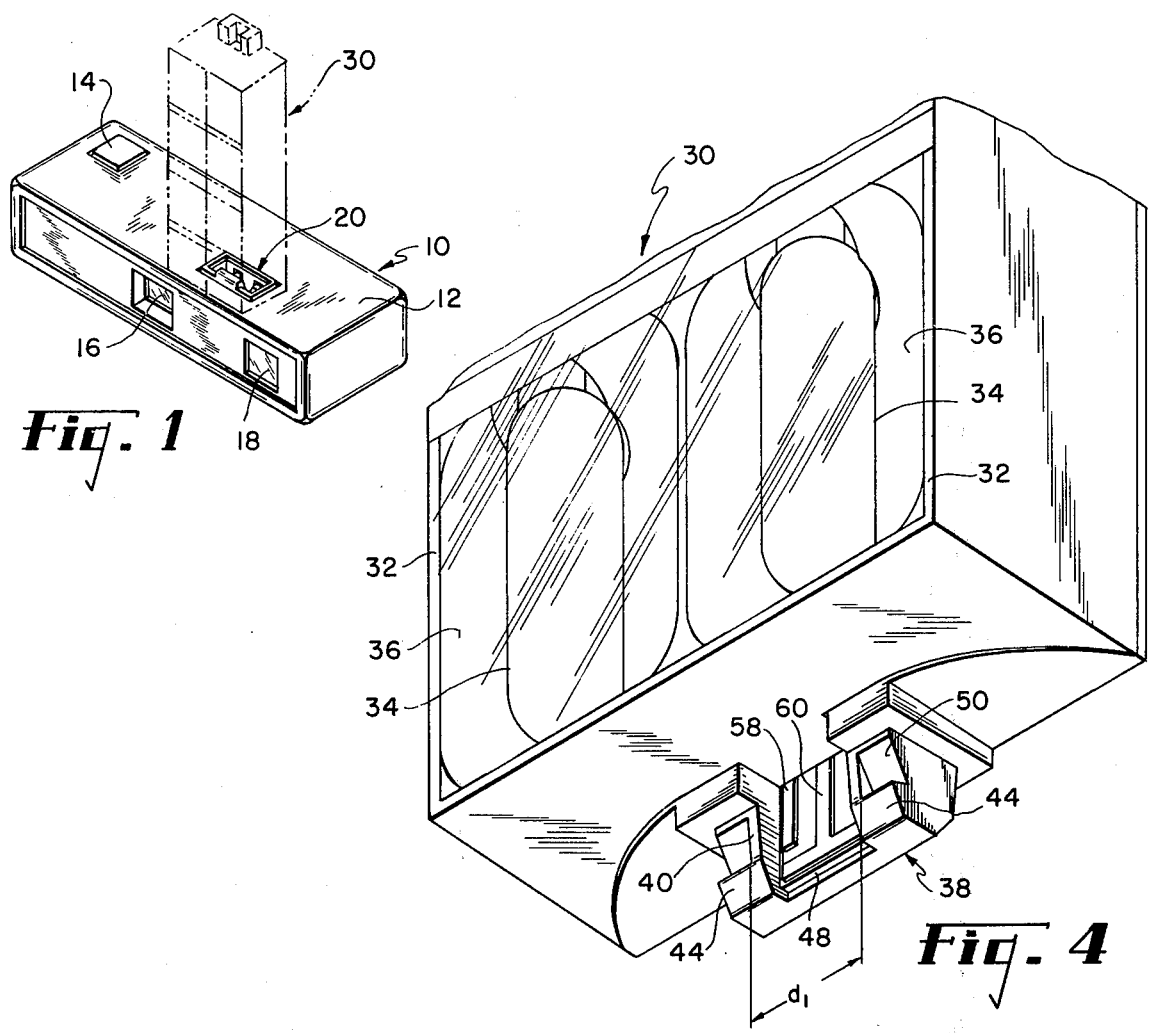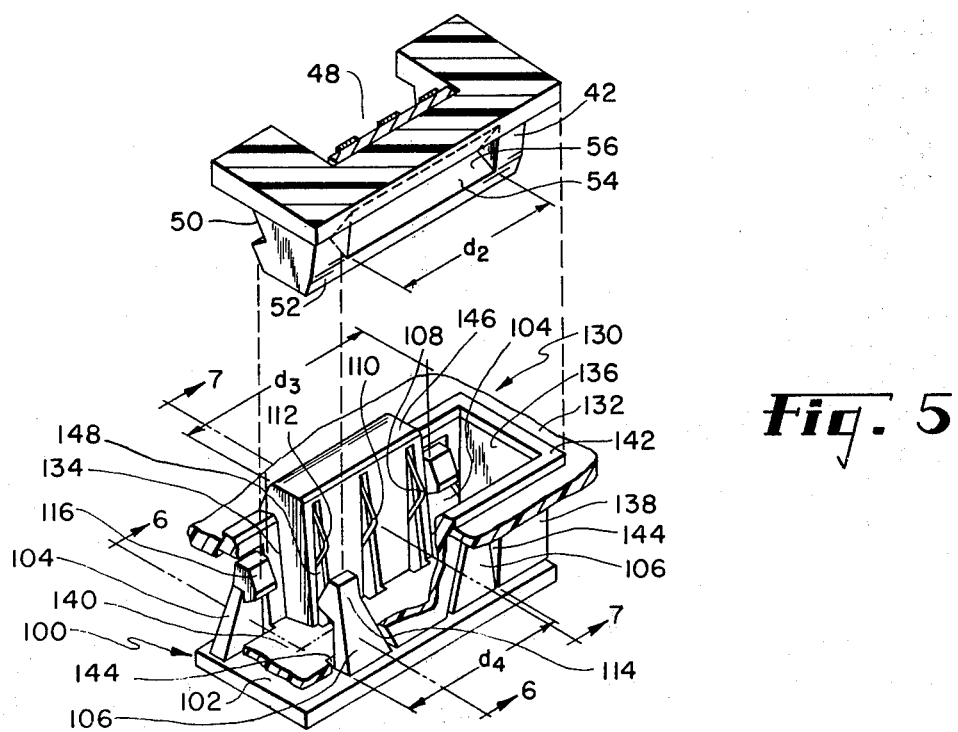

CAMERA FLASH SOCKET

CROSS REFERENCE TO RELATED APPLICATIONS

Reference is made to commonly assigned, co-pending U.S. application Ser. No. 528,527 filed on even date herewith in the name of H. L. Malone for CAMERA FLASH SOCKET, now abandoned.

BACKGROUND OF THE INVENTION

1. Field of the Invention

The present invention relates to photographic apparatus and more particularly, to a flash socket for receiving a photoflash unit.

2. Description of the Prior Art

The use of multilamp flash packages has now become generally accepted in the photographic industry. Many types of sockets and multilamp packages have been developed, including the camera sockets disclosed in U.S. Pat. Nos. 3,407,717 and 3,544,248. Each of these sockets is adapted to receive a disposable multilamp flash package that includes a base and a plurality of flashlamps, generally four, each with an individual reflector. Each of these sockets is adapted to be rotated in response to performance of some function of the photographic apparatus in order to advance a fresh flashlamp into a firing position within the camera. However, since the photographer may desire to take a mixture of flash and non-flash pictures, he frequently utilizes one or more lamps of a multilamp package and then removes the package. If the used multilamp package is not properly positioned when replaced on the camera, it is possible for the automatic indexing mechanism to advance a fired flashlamp into the firing position. Although many cameras include signaling mechanisms for indicating to the operator that an inoperative flashlamp is at the firing position, it is still possible to operate many of these cameras with an inoperative flashlamp, thereby producing an underexposed frame of film.

In a more recent development, multilamp arrays utilizing switching mechanisms have been developed that include a fresh flashlamp in the flash firing circuit without requiring rotation of the array. Such mechanisms are operative to select a fresh flashlamp, if available, even through the flash package is removed from the camera and later replaced. Several structures have been developed for coupling such multilamp arrays with a camera. One example discloses magnetic coupling of the flash array to the camera and another structure includes a thin blade-like member that is inserted in a mating socket. Each of these structures has created problems in retaining the multilamp flash array in proper orientation with respect to the electrical circuit of the camera.

SUMMARY OF THE INVENTION

Accordingly, it is an object of the present invention to provide an improved flash socket for receiving a multilamp flash unit.

It is a further object to provide such an improved flash socket that retains a received flash unit in position until the photographer desires to remove it.

It is a further object of the present invention to provide such an improved flash socket that prevents improper insertion of the flash unit into a non-rotatable flash socket.

It is a further object to provide such an improved flash socket that is inexpensive to manufacture and assemble.

These and other objects and advantages of the present invention are achieved by a flash socket that includes a plurality of resilient fingers, a projecting portion and electrical connector means. The resilient fingers mate with a plurality of surfaces in the base of a received flash unit inserted in the socket. In a preferred embodiment, four resilient fingers are provided, with two fingers positioned on each of two opposite sides of a rectangular socket opening. The distance between the pairs of fingers on opposite sides of the socket is different so that a mating base of a flash unit will be retained in the socket only if inserted in one orientation. The projecting portion cooperates with a mating recess in the base of a flash unit to prevent insertion of the base in an improper orientation. Electrical connector means are also provided for coupling the unit electrical circuit with the electrical circuit of the camera.

BRIEF DESCRIPTION OF THE DRAWINGS

In the detailed description of the preferred embodiment of the invention presented below, reference is made to the accompanying drawings in which:

FIG. 1 is a general orientation view of a camera incorporating a flash socket according to the present invention and showing in phantom a flash array adapted for use with the camera;

FIG. 4 is a perspective view of one end of the multilamp flash array of FIG. 2;

FIG. 5 is a perspective view of a flash socket according to the present invention, partially cut away to reveal its inner structure, along with a portion of one end of the multilamp flash array of FIG. 2;

DESCRIPTION OF THE PREFERRED EMBODIMENT

Figure 2:
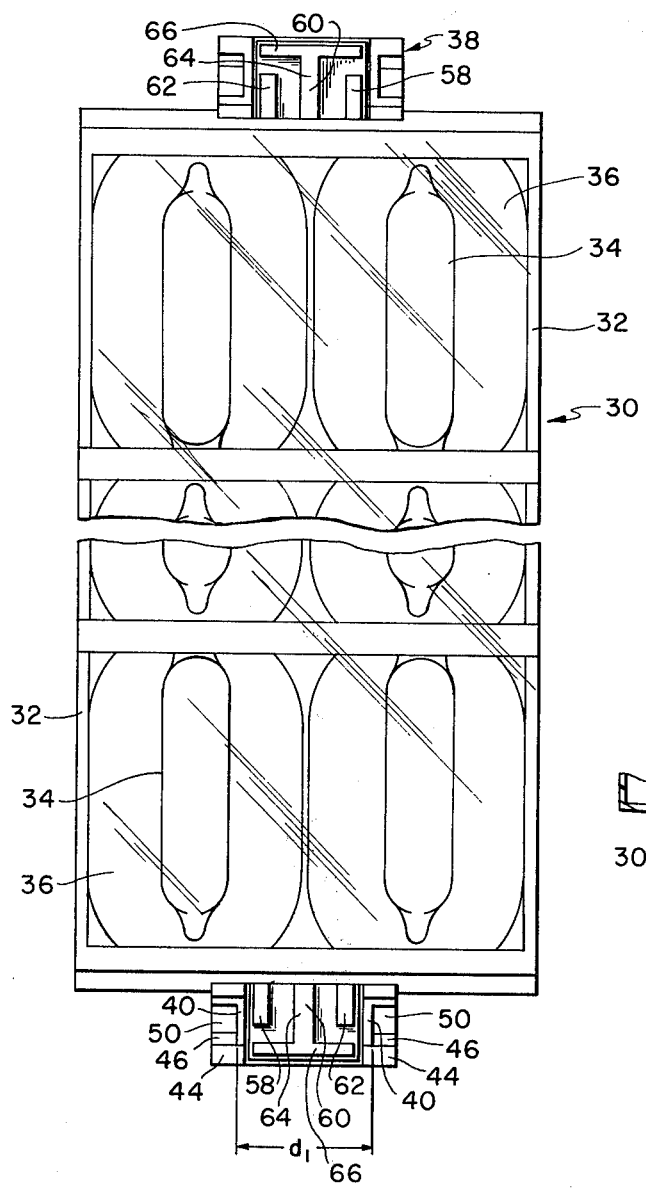
FIG. 2 is a front view of a multilamp flash array adapted for use with the flash socket of the present invention.

Because photographic apparatus is well known, this description will be directed in particular to elements forming part of, or cooperating more directly with, the present invention. Elements not specifically shown or described herein are understood to be selectable from those known in the art.

Referring now to FIG. 1, a camera 10 includes a body 12, a shutter release 14, a lens 16 and a viewfinder 18. Camera 10 also includes a socket, shown generally as 20, which is adapted for receipt of a flash unit, shown generally in phantom as 30.

Flash array 30, shown in FIGS. 2–4, for use with socket 20 will now be described. Flash array 30 has a body 32, which is generally rectangular and in which are included a plurality of individual flashlamps 34 with an associated reflector 36. In a preferred embodiment, flash array 30 comprises eight such individual flashlamps, four of them oriented in an upward direction as illustrated in FIG. 2 with four oriented in a downward direction, all eight located on one face of array 30. Array 30 further includes a base 38, of which, in a preferred embodiment of the array, two are formed; one on each of the two opposite ends of body 32. Base 38 is generally rectangular in shape and includes a front surface 40 and a rear surface 42. Cam surfaces 44 and retaining surfaces 46 are formed in front surface 40, which also defines a central recess 48 and a pair of outer recesses 50. The inner surfaces defining outer recesses 50 are separated by a transverse dimension of $d_1$ (FIG. 4). Cam surface 52 and retaining surface 54 are formed in rear surface 42, which also defines an elongated recess 56. The length of recess 56 is $d_2$ (FIG. 5). Base 38 further includes electrical contacts 58, 60 and 62 which are positioned within central recess 48. Contacts 58 and 62 are generally rectangular and extend parallel on a wall that defines recess 48. Contact 60 has a generally T-shaped form, with a central portion 64 and an end portion 66. Central portion 64 is generally parallel with contacts 58 and 62. End portion 66 extends perpendicularly to central portion 64 but is separated from the ends of contacts 58 and 62.

Figure 3:
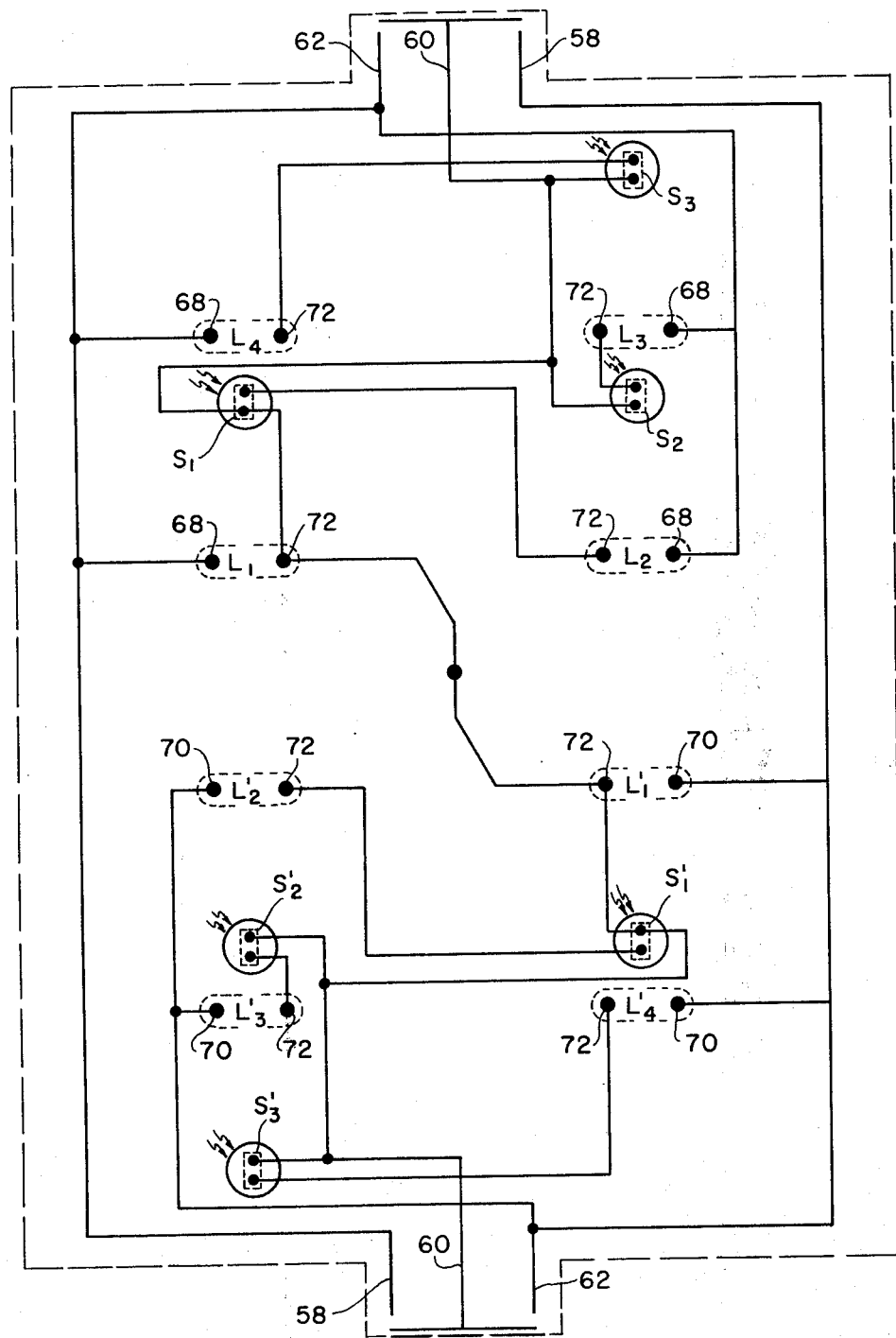
FIG. 3 is a schematic of the electric circuit of the multilamp flash array of FIG. 2.

FIG. 3 shows the electrical circuit of array 30. Contact 58 of one base 38 is connected to one terminal 68 of each of lamps $L_1$, $L_2$, $L_3$ and $L_4$ and to contact 62 in the second base 38. Contact 62 of one base 38 is connected to one terminal 70 of each of lamps $L_1'$, $L_2'$, $L_3'$ and $L_4'$ and to contact 58 in the second base 38. A second terminal 72 of each of lamps $L_1$ and $L_1'$ is connected to contact 60. A second terminal 72 of each of the remaining lamps 34 is sequentially connected to contact 60 by means of an internal switching mechanism. Associated with six of the lamps 34 are switches made of a material that is normally not electrically conductive but that becomes conductive when illuminated. Preferred are compounds of silver such as silver carbonate, silver chlorate or silver oxide but other materials may also be used. Switch $S_1$, associated with lamp $L_1$, mechanically connects contact 60 and terminal 72 of lamp $L_2$. Similarly, switch $S_2$ connects contact 60 and terminal 72 of lamp $L_3$ and switch $S_3$ connects contact 60 and terminal 72 of lamp $L_4$.

For operation, an electric pulse, of suitable magnitude, is applied to contacts 58 and 60 and thereby to terminals 68 and 72 of lamp $L_1$. Lamp $L_1$ will fire and in so doing, will illuminate and cause switch $S_1$ to close, thereby connecting terminal 72 of lamp $L_2$ to contact 60. In sequence, the four lamps in the top of array 30 will be fired by four successive electric pulses. Array 30 may then be inverted to secure firing of the other four lamps.

Figure 7:
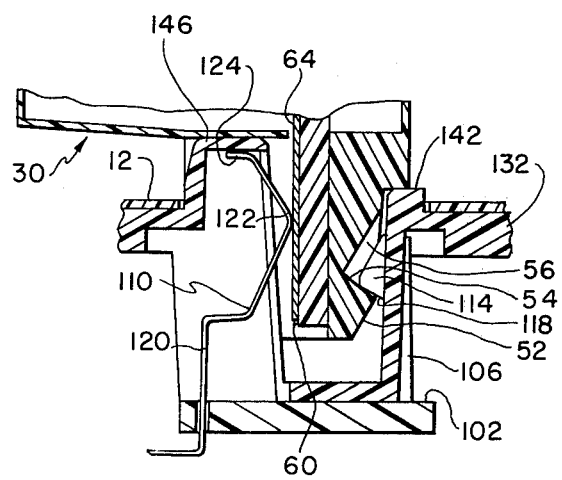
FIG. 7 is a view along the line 7—7 of FIG. 5.
Figure 6:
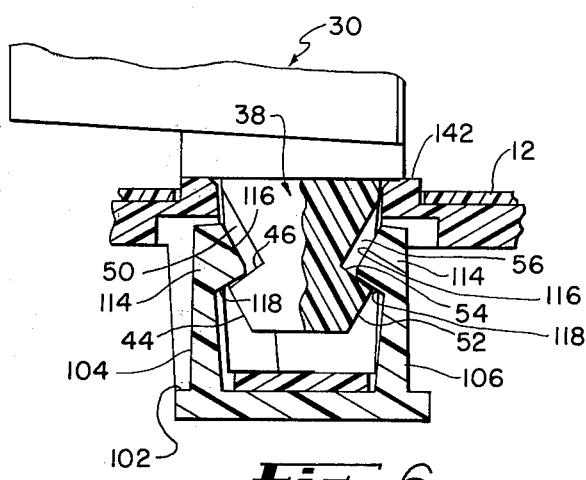
FIG. 6 is a view along the line 6—6 of FIG. 5.

Socket 20, as may best be seen in FIGS. 5-7, includes a lower section 100 and an upper section 130, each of which is preferably formed by molding a suitable material such as a polycarbonate plastic or similar material known in the art. Lower section 100 includes a bottom wall 102, two pairs of upstanding resilient fingers 104 and 106 and three electrical contacts 108, 110 and 112. Each of fingers 104 and 106 extends generally upward from bottom wall 102 and terminates in an engaging projection 114, including cam surface 116 and latch surface 118. Each of electrical contacts 108, 110 and 112, as may best been seen in FIG. 7, is formed of an upright section 120, a middle section 122 and an end 124. Upright section 120 extends through and is retained by bottom wall 102. Middle section 122 is generally triangular in shape and extends into the interior of socket 20. End 124 is positioned in engagement with the lower surface of upper section 130. Resilient fingers 104 face in a generally parallel direction as do resilient fingers 106, with engaging projections 114 on resilient fingers 104 being opposed to engaging projections 114 on resilient fingers 106. The inner surfaces of resilient fingers 104 are separated by a distance $d_3$, while the outer surfaces of resilient fingers 106 are separated by a distance $d_4$. Distance $d_3$ is slightly greater than distance $d_1$ on array 30, while distance $d_4$ is slightly less than distance $d_2$.

Upper section 130 includes a top wall 132, a front wall 134, a pair of side walls 136, a rear wall 138 and a bottom wall 140. Front wall 134, side walls 136, rear wall 138 and bottom wall 140 form a generally rectangular body extending downwardly from top wall 132. Upper section 130 further includes a generally rectangular flange 142, formed at the intersection of top wall 132 with front wall 134, side walls 136 and rear wall 138. Flange 142 extends generally upwardly from top wall 132. Access openings 144 in bottom wall 140, front wall 134 and rear wall 138 permit access to the interior of upper section 130 for resilient fingers 104 and 106 in lower section 100. Front wall 132 includes a projecting portion 146, which extends into the interior of upper section 130 and above flange 142, which terminates in bottom wall 140, and in which are formed access openings 148 through which electrical contacts 108, 110 and 112 extend.

During assembly of socket 20 in camera 10, lower section 100 and upper section 130 will be assembled together to form socket 20 by insertion of resilient fingers 104 and 106 through access openings 144 and electrical contacts 108, 110 and 112 through access openings 148. Upper and lower sections 100 and 130 can now be releasably connected by screw or rivet connectors or permanently bounded together by an adhesive, sonic bond or other similar method as is known in the plastics art. Socket 20 can then be mounted in camera 10, with top wall 132 flush with the top wall of body 12. Alternatively upper section 130 of socket 20 could be integrally formed with the top wall of body 12, with lower section 100 being assembled with and connected to upper section 130.

When the photographer wishes to take a picture with artificial illumination, a flash unit, such as flash array 30, an electronic flash unit or any other similar flash unit, is attached to camera 20 by inserting base 38 into socket 20. If base 38 is inserted in the proper orientation with respect to socket 20, projecting portion 146 is received by central recess 48. Cam surfaces 44 and 52 engage cam surfaces 116 on resilient fingers 104 and 106 initially move resilient fingers 104 and 106 laterally outward against their inherent bias. As base 38 is inserted further into socket 20, cam surfaces 44 and 52 of base 38 disengage from cam surfaces 116, thereby allowing resilient fingers 104 and 106 to move inwardly toward each other. Latch surfaces 118 engage retaining surfaces 46 and 54, as is shown in FIGS. 6 and 7. Due to the inward bias of fingers 104 and 106 and the slope of surfaces 46, 54 and 118, base 38 is urged downwardly into a firmly seated position within socket 20. Array 30 may be easily removed by exerting a lateral force on the array, thereby camming latch surfaces 118 and fingers 104 and 106 outwardly, out of engagement with retaining surfaces 46 and 54 on base 38 of array 30.

If the operator attempts to insert base 38 in an improper orientation with respect to socket 20, the asymmetrical shape of socket 20, include the position of projecting portion 146 relative to central recess 48 and the positioning and separation of resilient fingers 104 and 106 relative to recesses 50 and 56, prevents insertion and retention of base 38 in socket 20. If array 30 is presented to socket 20 with base 38 in an improper orientation, projecting portion 146 will not be received by central recess 48, thereby preventing easy insertion of base 38 into socket 20. Moreover, if the operator forces base 38 into socket 20, cam surfaces 116 on resilient fingers 104 and 106 may be initially cammed in an outwardly direction but their inward bias will exert a continuing upward force on base 38 and latch surfaces 118 will not engage retaining surfaces 46 and 54 on base 38. Therefore, flash array 30 will not be securely retained by socket 20.

During insertion of base 38 into socket 20, it may be seen that T-shaped end portion 66 of contact 60 first comes into contact with all three of electrical contacts 108, 110 and 112. This is a desirable configuration of the electric circuit, in that the contact 110 may be a ground contact within camera 10 and, by means of portion 66, any electrostatic charge on the array may be drained off to prevent premature firing of lamps 34. On further insertion of base 38 into socket 20, it may be seen that T-shaped end portion 66 disengages from contacts 108 and 112 whereas central portion 64 of contact 60 remains in engagement with contact 110. Upon full insertion of base 38, contacts 58 and 62 will be engaged with contacts 108 and 112, respectively, with contact 60 engaged with contact 110, thereby insuring proper electrical connection of lamps 34 in array 30 with the electrical source in the camera. In a preferred embodiment, camera 10 includes a piezo-electric crystal which is struck synchronously with actuation of the shutter mechanism, thereby generating a pulse of electrical energy that is applied to one of the lamps in array 30. However, it may be seen that socket 20 and base 38 of the present invention may be utilized as well with a battery contained within either camera 10 or array 30, so long as proper synchronization of flash firing and shutter actuation is maintained.

As has been noted earlier, a preferred embodiment of the array includes a base 38 located at opposed ends of body 32. Each base 38 includes identical components with the electrical contacts 58 and 60 controlling the firing of the four flashlamps located at the opposite end of array 30. Thus, it may be seen that the lamps farthest away from lens 16 will be fired during each actuation of the camera, thereby minimizing the possibility of red-eye. By means of the internal switching mechanism in the array described earlier, only one of the lamps is fired during each actuation of the camera with the internal switching mechanism insuring proper sequencing of the lamp firing. Upon completion of the firing of four lamps, array 30 may be detached from camera 10, inverted and re-inserted with four new flashlamps in proper positioning for firing. Thus, the new flash array and socket disclosed herein insure the proper positioning of the flashlamps for firing and proper sequencing of each flashlamp within the array.

The invention has been described in detail with particular reference to a preferred embodiment thereof, but it will be understood that variations and modifications can be effected within the spirit and scope of the invention.

We claim:

1. A camera flash socket adapted to releasably retain a flash unit having a base insertable into said camera flash socket in a predetermined orientation so that the flash unit is pointed in a predetermined direction with respect to said camera flash socket, said camera flash socket comprising:
    a body defining a central access opening for receiving the base of such a flash unit;
    a projecting member extending into said central access opening to permit insertion of such a base in only the predetermined orientation with resepct to said camera flash socket; and
    first and second pairs of resilient fingers extending into said central access opening and engageable with a base inserted in the predetermined orientation to releasably retain such a base in said camera flash socket, said first pair separated by a first distance and said second pair separated by a second distance, said first and second distances being different.

2. A camera flash socket according to claim 1 wherein said body further includes a first and a second section, said resilient fingers being formed on said first section and said projecting member being formed on said second section and said first and second sections being joined together to form said body.

3. A camera flash socket adapted to releasably retain a flash unit having an outwardly extending base adapted to be inserted into said camera flash socket in a predetermined orientation with the flash unit pointed in a predetermined direction with respect to said camera flash socket, said camera flash socket comprising:
    a body defining a central access opening for receiving the base of a flash unit; and
    first and second pairs of resilient fingers extending into said access opening and engageable with a received base to releasably retain such a base within said camera flash socket, said first pair separated by a first distance and said second pair separated by a second distance, said first and second distances being different.

4. A camera flash socket according to claim 3 wherein said body further includes first and second sections, said resilient fingers being formed on said first section and said first and second sections being joined together to form said body.

5. A camera flash socket for releasably retaining a flash unit having a base that defines a recess and that includes a plurality of retaining surfaces, said camera flash socket comprising:
    a first section including first and second pairs of resilient fingers, each of said resilient fingers comprising an engaging portion having a cam surface and a latch surface, each of said latch surfaces being engageable with a retaining surface on a received base to retain the base within said camera flash socket, said first pair separated by a first distance and said second pair separated by a second distance, said first and second distances being different; and
    a second section defining access openings through which said resilient fingers extend, a central access opening for receiving the base of a flash unit and a projecting member extending into said central access opening, said projecting member being positioned to extend into the recess in an inserted base and said resilient fingers being positioned within said central access opening to releasably retain such a base by engagement of said latch surfaces with the retaining surfaces.

6. A camera flash socket for releasably retaining a flash unit having a base, at least two electrical contacts and at least one lamp fireable by the application of electrical energy, said camera flash socket comprising:
  a first section comprising a bottom wall and first and second pairs of resilient fingers, each of said resilient fingers extending from said bottom wall and comprising an engaging portion having a cam surface and a latch surface, said first pair of fingers being aligned in a first direction and being separated by a first distance and said second pair of fingers being separated by a second distance different from said first distance and being aligned in a second direction opposed to said first direction;
  a second section including a plurality of walls that define a central access opening for receipt of the base of a flash unit, access openings through which said resilient fingers extend into said central access opening into engagement with the base of a received flash unit and electrical contact access openings; and
  at least two spring-biased electrical contacts, each extending through said bottom wall and through one of said electrical contact access openings into said central access opening and into contact with a corresponding electrical contact on the base of a received flash unit.

7. A camera flash socket for releasably retaining a flash unit having a base, at least two electrical contacts and at least one lamp fireable by the application of electrical energy, said camera flash socket comprising:
  a body defining a central access opening for receipt of such a base;
  a projecting member extending into said central access opening and positioned to permit insertion of such a base in only one predetermined orientation with respect to said camera flash socket;
  first and second pairs of resilient fingers extending into said central access opening, each of said first and second pairs of resilient fingers comprising an engaging portion defining a cam surface and a latch surface, said first and second pairs of fingers being oriented in a first direction and a second direction, respectively, and said first and second pairs being separated by a first distance and a second distance, respectively, said first and second directions being different and said first and second distances being different; and
  at least two spring-biased electrical contacts adapted to engage corresponding electrical contacts in a received flash unit.

* * * * *